United States Patent [19]

Klemann et al.

[11] Patent Number: 5,837,300

[45] Date of Patent: Nov. 17, 1998

[54] PHYSIOLOGICALLY COMPATIBLE LIQUID SUCROSE ESTERS AS LOW CALORIE FAT MIMETICS

[75] Inventors: Lawrence P. Klemann, Somerville; John W. Finley, Whippany, both of N.J.

[73] Assignee: Nabisco Technology Company, Chicago, Ill.

[21] Appl. No.: 630,452

[22] Filed: Dec. 19, 1990

Related U.S. Application Data

[63] Continuation-in-part of Ser. No. 336,821, Apr. 11, 1989, abandoned.
[51] Int. Cl.[6] .................................................. C07H 13/06
[52] U.S. Cl. .......................... 426/611; 426/804; 536/115; 536/119
[58] Field of Search .................... 426/601, 603, 426/607, 611, 804, 549, 605, 660; 536/115, 119

[56] References Cited

U.S. PATENT DOCUMENTS 3,600,186   8/1971   Mattson et al. .................... 426/601

FOREIGN PATENT DOCUMENTS 233856   8/1987   European Pat. Off. .

*Primary Examiner*—Carolyn Paden
*Attorney, Agent, or Firm*—St. Onge Steward Johnston & Reens LLC

[57] ABSTRACT

Mixtures of liquid sucrose fatty acid esters comprise an improved class of physiologically compatible fat replacements for foods. The compositions melt cleanly at 95° F. or below and comprise at least 35 percent of a mixture of tetra-, penta- and hexa- esters.

23 Claims, No Drawings

PHYSIOLOGICALLY COMPATIBLE LIQUID SUCROSE ESTERS AS LOW CALORIE FAT MIMETICS

RELATED APPLICATION

This application is a continuation-in-part of prior U.S. patent application Ser. No. 07/336,821, filed Apr. 11, 1989 by the inventors herein, now abandoned.

BACKGROUND OF THE INVENTION

This invention relates to the use of mixtures of liquid sucrose fatty acid esters as physiologically compatible edible compatible fat replacements.

Sucrose acetates were the first fatty acid esters of sucrose to be prepared commercially. The octaacetate is bitter, but nontoxic, and it was used to denature alcohol (Markley, K. S., *Fatty Acids,* part 2, Krieger Pub. Co., Malabar, Fla., 1983, pages 848–849). When found to be useful as nonionic surfactants, the lower sucrose esters of longer chain aliphatic acids, notably mono and diesters, received wide application in the food and pharmaceutical industries (Osipow, L., et al., 48 *Ind. Eng. Chem.* 1459 (1956) and Chung, H., et al., 58 *Cereal Chem.* 164 (1981)).

The lower fatty acid esters of sucrose used as emulsifiers readily hydrolyze on digestion in mammals to form normal food components, and are, in fact, also used as animal feed (Bobichon, L., in Hickson, J. L., ed., *Sucrochemistry, A.C.S.,* 1977, 115–120). Fully esterified sucrose esters were prepared and called "sugar fats" in 1921 (Hess, K., and Messmer, E. 54B *Ber.* 499–523 (1921)). It was subsequently reported that sucrose, like pentaerythritol, infra, and structurally related polyols which had more than four esterified hydroxyl groups were not absorbed or digested (Mattson, F. H., and Nolen, G. A., 102 *J. Nutrition* 1171 (1972); Mattson, F. H., and Volpenhein, R. A., 102 *J. Nutrition* 1177 (1972)). Called "sucrose polyesters", these esters have many of the physical properties of ordinary triglyceride fat. Hence, they were suggested as low calorie replacements of edible fats and oils in food compositions (U.S. Pat. Nos. 3,600,186, 4,446,165, and 4,461,782).

Some information about the relative absorbability of polyol esters is known; however, this information has never been related to anal leakage or the specification of particular liquid sucrose polyester mixtures which would reduce this problem. In one study comparing the relative hydrolysis of polyhydric alcohol oleate esters by a crude (bile juice) enzyme mixture containing pancreatic lipase, glycerol trioleate (hereinafter referred to as "triolein") was fully hydrolyzed; erythritol and pentaerythritol tetraoleates and adonitol pentaoleate were partially hydrolyzed; and sorbitol hexaoleate and sucrose octaoleate were not hydrolyzed (Mattson, F. H., and Volpenhein, R. A., 13 *J. Lipid Res.* 325–328 (1972)). The relative rates of hydrolysis were as follows (ibid., p. 327):

| oleate ester | micromoles oleic acid/min/ml |
| --- | --- |
| triolein | 2100 |
| erythritol tetraoleate | 1.9 |
| pentaerythritol tetraoleate | 1.1 |
| adonitol pentaoleate | 0.53 |
| sorbitol hexaoleate | 0 |
| sucrose octaoleate | 0 |

The same study yielded evidence that pancreatic lipase was not responsible for cleaving the tetra- and penta- esters. When pancreatic juice without bile was used as a source of enzymes, ester hydrolysis depended on the presence or absence of added sodium taurocholate. In the presence of sodium taurocholate, only those substrates that contained fewer than four ester groups were hydrolyzed. In the absence of sodium taurocholate, substrates that contained four and five ester groups were hydrolyzed. When purified pancreatic lipase was used to hydroyze the substrates, only triolein was hydrolyzed. The enzyme was unable to hydrolyze compounds containing more than three ester groups. The addition of sodium taurocholate completely blocked hydrolytic activity of the enzyme (ibid., p. 327).

In one balance study mixture of 43% octa-, 43% hepta-, and 14% penta- esters sucrose polyester was absorbed 4.5%, or 7.5% with added hydrogenated palm oil, compared with 92.5% for a soybean oil control ("Olestra As A Calorie Free Substitute For Fats and Oils", Procter and Gamble Food and Drug Administration Food Additive Petition 7A3997(1987) (hereinafter "PG FA Petition"), Appendix EA-9, vol. 4, p. 911). In a balance study by another group of investigators, rats fed a sucrose polyester preparation that had an average of 6.5 ester groups per molecule excreted only 60 to 70% of the ingested polyesters (Aust, L., et al., 25 *Ann. Nutr. Metab.* 255–261 (1981)).

A tracer study of rats fed esters with radioactively labelled oleate residues to determine their rate and extent of absorption (Mattson, F. H., and Volpenhein, R. A., 102 *J. Nutr.* 1177–1180 (1972)). The tagged oleic acid was recovered in the thoracic duct lymph, and the relative rates of absorption of the different esters were compared. Triolein oleic acids entered the lymph rapidly; oleic acids fed as erythritol tetraoleate appeared more slowly and did not attain maximum relative activity for 12 hours; oleic acid fed as xylitol pentaoleate entered the lymph even more slowly, and, like erythritol tetraoleate, did not achieve maximum relative activity until 12 hours after feeding. The cumulative recoveries over a 24-hour period were also compared. During that interval, 12% of the fed triolein was not absorbed, 33% of the erythritol tetraoleate, 76% of the xylitol pentaoleate and 98% of sucrose octaoleate was not absorbed.

One of the main problems in attempting to formulate fat-like compounds that have decreased absorbability and thus low caloric properties is to maintain the desirable and conventional physical properties of edible fat. To be a practical low calorie fat, a compound must mimic conventional triglyceride fat by affording the same utility in various fat-containing food compositions such as shortening, margarine, cake mixes, and the like, and be useful in frying or baking. It must also be physiologically compatible.

Nondigestible or nonabsorbable sucrose polyesters have proved disappointing as fat replacements when tested in feeding trials, where gastrointestinal side effects occurred, in some cases so extreme that frank anal leakage was observed (discussed in the Hamm, D. J., 49 *J. Food Sci.* 419–428 (1984) and Haumann, B. J. 63 *Amer. Oil Chem. Soc.* 278–288 (1986)).

The expectation from the prior art would be that liquid sucrose polyesters compositions would cause severe anal leakage problems. For example, see the disclosure by Jandacek in U.S. Pat. No. 4,005,195 that adding certain high melting fatty acids or fatty acid sources is a necessary remedy. See also the disclosure by Howard and Kleinschmidt in European Patent Application No. 352,907, of moderating the same problem with microfibrilated cellulose. In U.S. Pat. No. 4,797,300, Jandacek and Letton assert that making solid sucrose polyesters with mixed short and long chain fatty acids having a degree of esterification of 7 to 8 avoids the problem of anal leakage. However, to produce a liquid, this material is blended with 75 to 90% of a liquid triglyceride oil. European Patent Application No. 233,856 Bernhardt asserts that hydrogenating sucrose polyester to obtain a pseudoplastic rheology also moderates the problem of anal leakage at the levels tested when compared to liquid sucrose polyesters. However, European Patent Application No. 352,907 employs seven percent microfibrilated cellulose with these plastic materials.

None of the prior art sucrose polyesters have been useful in liquid form without the need for large amounts of added anti-anal leakage agents which affect the liquid character of the materials. A better solution would provide liquid sucrose polyesters employing chemistry more compatible with the human digestive process, while still providing a significant decrease in caloric density vis-a-vis glyceride fats.

SUMMARY OF THE INVENTION

An object of the present invention is to provide a liquid sucrose polyester fat mimetic which is low in calories, but more compatible with normal digestion.

It is a more specific object of the present invention to provide liquid sucrose polyester formulations which are less susceptible to anal leakage and other laxative side effects, but retain their liquid character.

It is a further object of the present invention to provide sucrose ester formulations which are less susceptible to laxative side effects, but which retain their liquid character and can provide essential or desirable fatty acids.

The invention provides a liquid fat mimetic comprising a partially digestible blend of liquid sucrose fatty acid esters which, when eaten, exhibit reduced anal leakage as compared to liquid sucrose polyesters which are non-absorable. The liquid sucrose polyesters are employed in any food or any food preparation process where a fat or oil (i.e., triglyceride fat) is normally employed. The food compositions of this invention comprise the new fat mimetic and at least one additional food material.

DETAILED DESCRIPTION OF THE INVENTION

The compounds of this invention comprise liquid sucrose fatty acid ester mixtures which exhibit reduced anal leakage. These materials comprise an improved class of fat mimetic compounds, and their incorporation into any food composition or use in conjunction with any edible material can improve those compositions and materials.

Sucrose has eight hydroxyl groups (three primary and five secondary) available for esterification, and the compounds of this invention comprise mixtures of sucrose molecules wherein at least 40%, preferably at least 50%, are esterified with from four to six fatty acids. More preferred mixtures have 70% to 95% of the sucrose molecules with four to seven hydroxyl groups esterified. The partially-digestible sucrose polyester mixtures of the present invention are liquid, and preferably are essentially newtonian fluids at 100° F. Preferred mixtures melt cleanly and completely at temperatures no higher than about 95° F., more preferably 92° F. or below.

This invention comprises mixtures of partially esterified sucrose molecules having fatty acid residues in ester linkage which are effective to provide a liquid character and yet form physiologically compatible fat replacements for edible materials, such as foods and pharmaceuticals. These liquid sucrose polyesters have a discernable fatty character prior to consumption which permits them to function well in edible materials as replacements for all or a portion of the normal or natural fat content. It is an advantage of the present invention, however, that they also have a decreased lipophilic nature after the digestive process despite their ability to resist complete digestion and absorption. Thus, they are useful in preparing reduced calorie products.

The term "food" is broad and includes anything edible, whether or not intended for nutrition, e.g., it can be an additive such as an antioxidant for fats or oils, an antispatter agent, an emulsifier, a texture modifier such as a plasticizer for chewing gum, or other minor functional ingredient such as a carrier or diluent for use in flavorings, pharmaceuticals, and the like. Thus, chewing gum, flavored coatings, oils and fats intended only for frying, and the like are included. In these, all or a portion of the usual fat is replaced by compounds of the invention.

The liquid sucrose esters of this invention may be prepared by any known method. Generally speaking, the esters may be prepared by a transesterification reaction between fatty acid alkyl esters and sucrose in the presence of a catalyst (Feuge, R. O., et al., 47 *J. Amer. Oil Chem. Soc.* 56–60 (1970)) and in the presence or absence of a solvent (Rizzi, G. P., and Taylor, H. M., 55 *J. Amer. Oil Chem. Soc.* 398–401 (1978)). Polyesters are generally prepared by using an excess of fatty acid ester over the theoretical stoichoimetric amount required; partial esters, by using less than a stoichoimetric amount of fatty acid. One technique for preparing the esters of this invention is using an essentially stoichoimetric amount of fatty acid esters necessary to fully esterify the sucrose, and stopping the reaction before full esterification is achieved to obtain a partially digestible sucrose ester mixture.

Another technique for preparing the liquid sucrose esters of this invention is introducing fatty acid moieties sequentially to afford an array of structures with well defined functional and isomeric characteristics. This molecular assembly process also allows for the placement of natural or synthetic blends of acids. In one embodiment, the reaction is initiated to permit first stage esterification of from one to three hydroxyl groups, interrupting the esterification, conducting a separation or hydrogenation step if desired, and then continuing the esterification (with the same or a different fatty acid or fatty acid mixture) to esterify additional hydroxyls. The ester bonds, are formed preferentially and, therefore, earlier in the reaction, at the sites of the primary hydroxyls. The reaction is preferably continued until the mixture of sucrose polyesters has a degree of esterification of from 4 to 7, desirably from 4.5 to 6.5, more narrow by from 4.5 to 5.5. In this embodiment, it is posssible to place specific fatty acids at specific positions to achieve specified properties in the final product.

The fatty acid residues may be the same or different, and may comprise a mixture of residues. The term "fatty acids" used here means organic fatty acids of the formula RCOOH containing two to thirty carbons, more narrowly 10 to 23, and even more narrowly 12 to 20, and may be synthetic or natural, saturated or unsaturated, with straight or branched chains. Examples of fatty acids that can be used in this invention are acetic, propionic, butyric, caproic, caprylic, pelargonic, capric, lauric, undecanoic, myristic, palmitic, stearic, arachidic, behenic, montanic, melissic, cerotic, oleic, linoleic, linolenic, eleostearic, palmitoleic, vaccenic, nervonic, erucic, brassidic, lignoceric and arachidonic acids. Mixtures of fatty acids may also be used, such as those obtained from non-hydrogenated, partially hydrogenated or hydrogenated soybean, sunflower, high oleic sunflower, peanut, safflower, olive, sesame, rice bran, canola, babassu, coconut, palm kernel, palm, cottonseed, mustard seed, nasturtium seed, low erucic rapeseed, marine, dairy butter or corn oil. Other fats such as tallow or lard, or plant waxes may also be used. Specific fractions of processed or unprocessed oils, fats, or waxes may also be used.

To prepare compositions providing nutrition, a highly desirable or essential fatty acid such as linoleic is esterified to at least one of the three primary hydroxyls in one or more reaction stages. One group of desirable fatty acids includes oleic, linoleic, linolenic, eicosapentaenoic and mixtures of these. Another, narrower such group comprises fatty acid esters selected from the group consisting of linoleic, linolenic, eicosapentaenoic, and mixtures thereof. Partial digestion of these esters would release these fatty acids for their beneficial effect. Other acids may alternatively be placed at the primary hydroxyls for their release in a manner not heretofore suggested for sucrose polyester fat replacements.

The digestion residues of the products of this invention have decreased hydrophobicity, and correspondingly increased hydrophilicity, relative to its fat mimetic precursor. Such a product of a process of controlled digestion would tend to have not only decreased oiliness, but also increased ability to function as an emulsifier. Such a controlled digestion product will be less prone to exist in the GI tract as a persistent oil compared with substances taught in the prior art.

The enhanced emulsifying capacity of the enzymatic cleavage products derived from compositions of the invention substantially overcomes a major problem which has heretofor limited the widespread use and development of highly desirable low calorie synthetic fats and oils in foods and food preparation. This effect can be enhanced by modification of the preparation process. For example, by preparing the esters in a staged process, reacting the sucrose first with suitable unsaturated fatty acids to occupy primary hydroxyl positions and then reacting the resulting partial ester with a $C_{16}$ to $C_{20}$ saturated fatty acid, the digestion residue of the fat mimetics can be made to become higher melting as well as more hydrophilic than the liquid fat mimetic itself. In another embodiment, branched fatty acids are placed at one to three hydroxyl positions to render them especially resistant to hydrolysis. Thus, in one embodiment sucrose is esterified at at least one secondary hydroxyl with a fatty acid selected from the group consisting of palmitic, stearic, branched chain fatty acids, and mixtures of these. Preferably, at least one such acid is positioned at the secondary hydroxyl positions following a first reaction stage employing a straight chained fatty acid.

In one class of preferred compounds, the fatty acid residues attached to sucrose exhibit differential reactivity with respect to cleavage by digestive enzymes. This results not only in the controlled and limited availability of effective caloric value, but also the selective conversion of the fat mimetic to a product or intermediate with a less oil-like nature. The more readily digestible carboxylic acid residue can be a highly desirable essential acid or a nutritionally advantageous carboxylic acid such as those mentioned or others, as well as low or medium molecular weight carboxylic acids (e.g., acetic, propionic, butyric, caproic or caprylic acids) which would limit caloric delivery and provide additional ability to control functionality. The sucrose ester mixtures of this invention provide from about 0.5 to 8.5, preferably 1.0 to 6.0, more narrowly less than 5 kcal/gram upon being metabolized.

The following is a representative complement of esters that make up the liquid, physiologically compatible sucrose ester mixture of the invention.

| ester | range (%) |
| --- | --- |
| tri- | 0–50 |
| tetra- | 5–50 |
| penta- | 5–50 |
| hexa- | 5–50 |
| hepta- | 0–30 |

The total of tetra- to hexaesters is at least 40% and more narrowly at least 60%. The representative complement of esters in this illustration does not imply that the partially digestible esters of this invention need exhibit a spectrum of esters differing incrementally in the degree of substitution. The total of tetra- to heptaesters can desirably be in the range of from 70% to 95%. Significant levels of mono-, di- and triesters are not preferred, except where emulsification is desirable; for most applications, the level can be maintained below 15 weight percent, preferably less than 2 weight percent. Similarly, only low levels of liquid octa-esters are permitted and should be kept to less than 30%, desirable less than 15%. The more solid octa-esters do not contribute as much to anal leakage and thus can be used as desired to the extent that they do not start increasing problems of this type.

Representative of foods which can contain the sucrose esters of this invention in full or partial replacement of natural fat are: frozen deserts, e.g., frozen novelties, sherbet, ice cream, ices, or milk shakes; puddings and pie fillings; margarine substitutes or blends; flavored bread or biscuit spreads; mayonnaise; salad dressing, both emulsified and non-emulsified; filled dairy products such as filled cream or filled milk; dairy or non-dairy cheese spreads; coffee lighteners, liquid and dried; flavored dips; frying fats and oils; reformed and comminuted meats; meat substitutes or extenders; egg products; nut products, such as peanut butter; whipped toppings; compound coatings; frostings and fillings; cocoa butter replacements or blends; candy, especially fatty candies such as containing peanut butter or chocolate; chewing gum; bakery products, e.g., cakes, breads, rolls, pastries, cookies, biscuits, savory crackers; mixes or ingredient pre- mixes for any of these; as well as flavor, nutrient, drug or functional additive delivery systems.

Representative of food products are: baked foods, such as cookies, crackers, biscuits, cakes and the like which all contain at least a flour or starch component in addition to the fat mimetic of this invention; snack products which also contain at least a flour or starch component in addition to the fat mimetic; emulsion products, such as margarine, salad dressing and mayonnaise which all contain emulsions having a fat phase including the fat mimetic and an aqueous phase; candies and confections which contain a sweetener such as sugar or aspartame in addition to the fat mimetic; and dairy product: substitutes which contain a dairy protein such as whey, casein or caseinate, or the like in addition to the fat mimetic.

In one of its broad aspects, the invention provides a process for preparing a food product with reduced calories comprising adding a fat mimetic of the invention to at least one other food ingredient in the preparation of the food. The fat mimetic can be in total or partial substitution of the normal or natural fat content. Typical food ingredients will be selected from the group consisting of protein, carbohydrates, fats, nutrients and flavors. These ingredients are typically added in the form of flours, meals, dried vegetables, meats, dried meats, starches and the like.

The expectation would be that liquid sucrose compositions would cause severe anal leakage problems. The disclosures by Jandacek in U.S. Pat. No. 4,005,195 (addition of certain high melting fatty acids or fatty acid sources), Howard and Kleinschmidt in European Patent Application No. 352,907 (microfibrilated cellulose), Bernhardt in European Patent Application No. 233,856 and Jandacek and Letton in U.S. Pat. No. 4,797,300 (pseudoplastic or solid), all eliminate the liquid character of the sucrose polyesters to control anal leakage.

The partially-digestible sucrose polyester mixtures of this invention do not exclude the use of solid triglycerides, cellulose derivatives or solid sucrose polyesters, because in addition to any utility which they may have for reducing anal leakage, they still have significant other utilities in food products. Compositions of this invention are, however, intended to have the advantage of significantly reducing the caloric content of fatty foods while not requiring anti-anal leakage agents.

Where desired for particular applications, the partially digestible mixtures of this invention can be formulated to melt within a narrow temperature range, and/or to exhibit an appreciable level of solids at room temperature. This can be achieved by hydrogenating the fatty acid constituents of the sucrose polyesters either before, or after partial or complete esterification. Preferably, however, this is achieved by employing naturally occurring monounsaturates or saturates to achieve the proper Solid Fat Content. In the example of a whipped topping mix which can be prepared as described in U.S. Pat. No. 3,295,986, a Solid Fat Content profile within the following ranges is desired:

| Temperature (°F.) | Solid Fat Content |
| --- | --- |
| 50 | at least 45 |
| 70 | at least 30 |
| 80 | 15–25 |
| 92 | 5–20 |
| 100 | 0–10 |

To achieve these levels, a liquid sucrose polyester mixture of this invention can be blended with the necessary amounts of plastic fat or fat mimetic to increase the Solid Fat Content at the indicated temperatures. Formulations of this type are intended to reduce the anal leakage for sucrose polyesters to levels which cannot be achieved for liquid sucrose polyesters of the prior art having high levels of hepta- and octaesters.

The prior art depends upon high levels of octaesters, typically greater than 70%, with at least 90% being octa and heptaesters, and is forced to process them to achieve plastic, non-newtonian viscosities by hydrogenation, or add non-nutritious thickening fillers or high levels of high melting fatty acids to reduce anal leakage which is extreme in the case of liquid sucrose polyesters. The prior art has not been able to control anal leakage for liquid sucrose polyesters and still maintain low caloric levels. The present invention is intended to enable the use of liquid sucrose polyesters which maintain their liquid character while controlling this problem. A number of liquid sucrose polyesters of the present invention are shown below in a number of specific food formulations.

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

In this example, a reduced calorie Italian dressing may be prepared using partially digestible sucrose esters.

| Ingredient | Parts |
| --- | --- |
| Sugar | 4.0 |
| Xanthan Gum | 0.12 |
| to water | 21.5 | at 125° F. and mix three minutes. Then add

| | |
| --- | --- |
| Garlic Vinegar Puree | 1.5 |
| Lemon Juice | 4.0 |
| White Vinegar | 13.0 | and mix three minutes. Add

| | |
| --- | --- |
| Salt | 4.5 |
| Minced Garlic | 0.75 |
| Minced Onion | 0.50 |
| Red Bell Peppers | 0.05 |
| B.L. Spice Blend | 0.08 | and mix three minutes. Fill this aqueous phase 50% by weight with a sucrose ester blend prepared by transesterifying sucrose with corn oil to yield an ester mixture having the following composition

| | |
| --- | --- |
| monoesters | 5% |
| diesters | 10% |
| triesters | 25% |
| tetraesters | 25% |
| pentaesters | 25% |
| hexaesters | 10% |

EXAMPLE 2

A salad dressing may be prepared by adding

| Ingredient | Parts |
| --- | --- |
| Water | 29.0 |
| to Sugar | 12.0 |
| and Spices | 4.5 | and mixing three minutes. Then

| | |
| --- | --- |
| Salted Egg Yolks | 5.5 |
| and Modified Starch | 3.0 | are added and mixed two minutes. To the aqueous mixture are added

| | |
| --- | --- |
| Sucrose Di- to Hepta Oleates | 40.0 |
| (10% di, 15% tri, 25% tetra, 25% penta, 15% hexa, 10% hepta) | |
| and Distilled Vinegar | 6.0 |

The mixture is homogenized three minutes and passed through a calloid mill set at 60 prior to filling in the normal process.

EXAMPLE 3

A whipped topping may be prepared by dissolving

| | Parts |
|---|---|
| Water | 46.6 |
| Sugar (4x) | 23.0 |
| Dextrose | 1.0 |
| Polysorbate 60 | 0.7 |
| Sorbitan Monostearate | 0.3 |
| Carageenan | 0.2 |
| Guar Gum | 0.1 |
| Vanilla | 0.1 | to make an aqueous phase. To this added Sucrose Di to Hepta

| | |
|---|---|
| Sucrose Di to Hepta Oleates (5% di, 10% tri, 25% tetra, 25% penta, 20% hexa, 15% hepta) | 18.0 |
| Stearates (5% di, 10% tri, 25% tetra, 25% penta, 20% hexa, 15% hepta) | 5.0 |

1:1 randomized mixture of 5.0 oleates and stearates with high agitation. The topping can be packaged and refrigerated or frozen.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A food composition comprising a fat mimetic comprising at least 35% by weight of the mixture of sucrose tetra- to hexa- fatty acid esters and at least one additional food material.

2. A food composition according to claim 1 wherein said mixture comprises 0 to 50% tri-, 5 to 50% tetra-, 5 to 50% penta-, 5 to 50% hexa-, and less than 30% octa- substituted esters.

3. A food composition according to claim 2 wherein said mixture comprises at least 50% tetra- to hexa- substituted esters.

4. A food composition according to claim 3 wherein the total of tetra-, penta- hexa- and hepta- substituted esters ranges from 70 to 95%.

5. A food composition according to claim 4 wherein the total of tetra-, penta- and hexa- substituted esters is at least 60%.

6. A food composition according to claim 4 wherein the mixture of sucrose polyesters has a degree of esterification of from 4.5 to 6.5.

7. A food composition according to claim 4 wherein the fatty acid esters comprise $C_{10}$ to $C_{23}$ fatty acid esters.

8. A food composition according to claim 2 wherein the mixture of sucrose polyesters has a degree of esterification from 4 to 7.

9. A food composition according to claim 1 wherein the fatty acid esters comprise $C_2$ to $C_{30}$ fatty acid esters.

10. A food composition according to claim 1 wherein said fatty acid esters are selected from a group consisting of acetic, propionic, butyric, caproic, caprylic, pelargonic, capric, lauric, undecanoic, myristic, palmitic, stearic, arachidic, behenic, montanic, melissic, cerotic, oleic, linoleic, linolenic, eleostearic, erucic, brassidic, lignoceric, palmitoleic, nervonic, vaccenic, and arachidonic acid esters, and mixtures thereof.

11. A food composition according to claim 1 wherein said fatty acid esters are derived from non-hydrogenated, partially hydrogenated or hydrogenated oils selected from the group consisting of soybean, sunflower, peanut, safflower, olive, sesame, rice bran, canola, babassu, coconut, palm kernel, palm, cottonseed, mustard seed, nasturtium seed, low erucic rapeseed, dairy butter, lard, tallow, marine and corn oils and fractions thereof.

12. A food composition according to claim 11 wherein the sucrose is esterified at at least one secondary hydroxyl with a fatty acid selected from the group consisting of palmitic, stearic, branched chain fatty acids, and mixtures of these.

13. A food composition according to claim 1 wherein the sucrose esters provide from 0.5 to 8.5 kcal/gram.

14. A food composition according to claim 13 wherein the sucrose esters provide from 1.0 to 6.0 kcal/gram.

15. A food composition according to claim 13 wherein the sucrose esters contain less than 40% of hepta- and octa- substituted esters combined.

16. A food composition according to claim 15 wherein the fat mimetic melts at 92° F. or less and is a newtonian liquid at 100° F.

17. A food composition according to claim 1 wherein the fat mimetic melts completely at 95° F. or less.

18. A food composition according to claim 1 wherein the sucrose is esterified at at least one primary hydroxyl position with fatty acid esters selected from the group consisting of linoleic, linolenic, eicosapentaenoic, and mixtures thereof.

19. A food composition according to claim 1 which is a baked product which includes starch or flour in addition to the fat mimetic.

20. A food composition according to claim 1 which is an emulsified product selected from the group consisting of margarine, margarine substitutes, mayonnaise and salad dressing and comprises an emulsion of an aqueous phase and a fat phase including the fat mimetic.

21. A food composition according to claim 1 which is a confection and includes a sweetener in addition to the fat mimetic.

22. A food composition according to claim 1 which is a dairy product substitute and includes a dairy protein in addition to the fat mimetic.

23. A process for preparing a food product with reduced calories, comprising: adding to at least one other food ingredient, a liquid sucrose polyester comprising at least 35% by weight of a mixture of tetra-, penta- and hex- fatty acid esters of sucrose.

* * * * *